Patented June 22, 1943

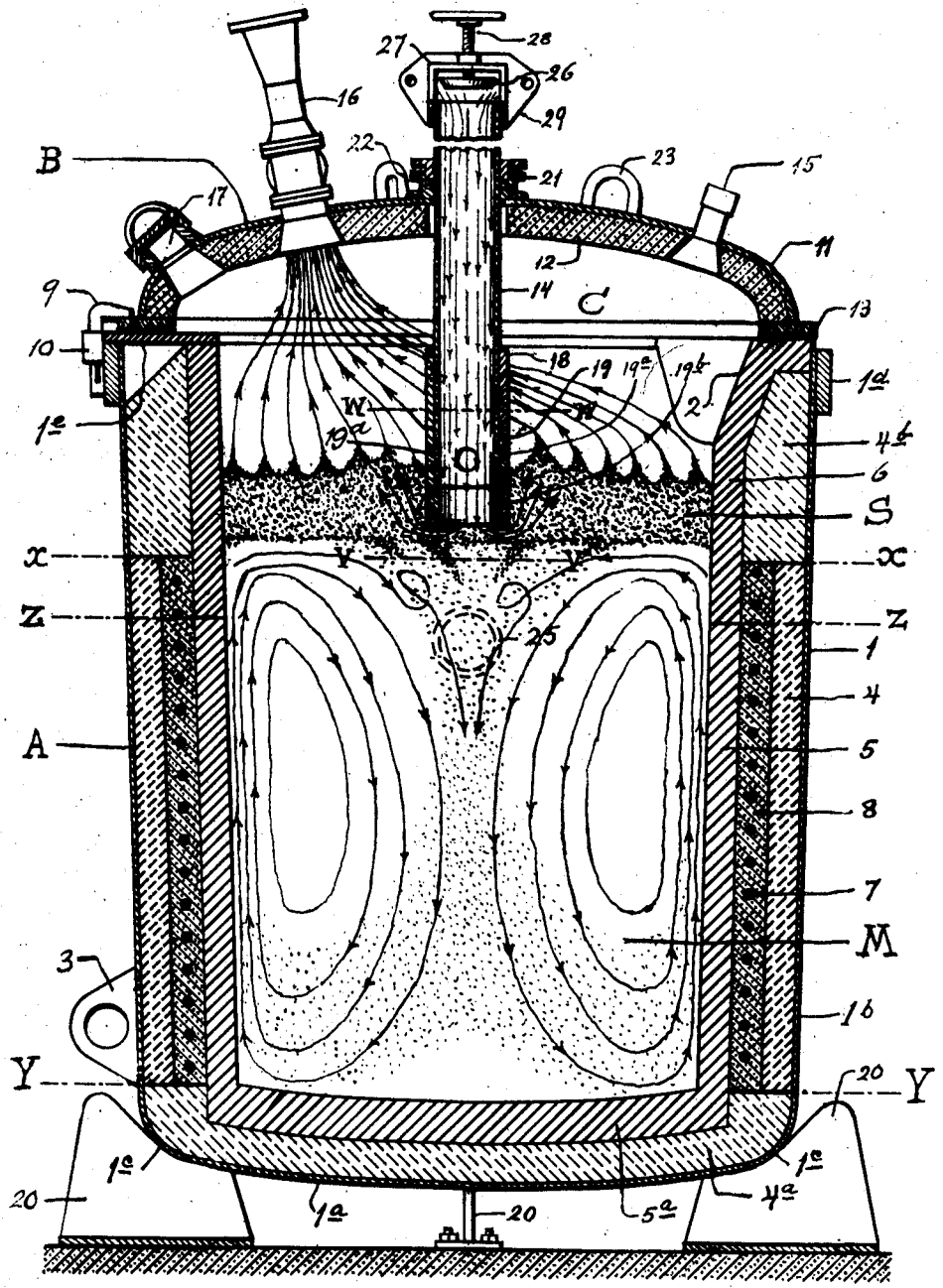

2,322,618

UNITED STATES PATENT OFFICE 2,322,618

APPARATUS FOR CONVERTING HIGH-PHOSPHORUS PIG IRON INTO HIGH-GRADE LOW-PHOSPHORUS STEEL

Baltzar E. L. de Maré, Germantown, Pa.

Application March 25, 1942, Serial No. 436,192

9 Claims. (Cl. 13—26)

This invention relates to a method and apparatus for converting liquid high-phosphorus pig iron, as for instance ordinary basic iron, into high-quality low-phosphorus steel, either directly, in which case the conversion as carried out by the apparatus comprises three periods of treatment, namely, an ore-oxidizing, an air-oxidizing and a de-oxidizing period, or in conjunction with an acid open-hearth or an acid electric furnace, in which case the conversion as carried out by the apparatus comprises two periods of treatment, namely an ore-oxidizing and an air-oxidizing period, the third or de-oxidizing period being carried out by the open-hearth or electric furnace.

One object of the invention is to provide an apparatus which, considering the several functions it has to perform, is relatively simple in design, economical in first cost, maintenance and repairs, and which can be manufactured and installed, ready for operation, in a relatively short time, the electrical part of its functions being carried out by a three-phase alternating electric current of normal frequency as supplied by electric utility concerns, thus requiring no special electric equipment.

Another object of the invention is to provide an apparatus capable of a relatively high rate of production, this being insured by the vigorous dynamic reactions of each of the three periods of treatment, due to the stirring effect of the electro-magnetic force induced in the metal under treatment by the above-mentioned electric current being made to pass through a helical electric coil surrounding said body of metal contained in the apparatus.

Another object of the invention is to provide an apparatus highly insulated against loss of heat by radiation or conduction and capable of heating its inner lining of refractory material to a high temperature, both preliminary to and during the various treatments by the direct electric resistance of the coil carrying the said stirring current, for which reason said coil is made of a heat-resisting alloy with a working temperature of from 1500 to 2000 degrees Fahr.

Another object of the invention is to provide an apparatus capable of carrying out the treatments of the liquid metal without having to use carbon-hydrogen fuel, solid, liquid or gaseous, except for melting the oxidizing slag for the ore-oxidizing treatment, sufficient heat being generated by the exothermic reactions involved in the treatments and by the combustion in the special combustion chamber provided for inside the apparatus of the carbon monoxide gas generated by the decarburization of the liquid metal into carbon dioxide, the turbulent state of the slag during this decarburization promoting the absorption by the slag of the heat thus generated. As for the heat required for the melting and super-heating of additions made to the contents of the apparatus, including the acid deoxidizing slag, during the third or deoxidizing period of the treatment, this is preferably generated electrically by the arcs of an electric furnace, its capacity about one tenth of that of the apparatus.

Another object of the invention is to provide an apparatus which, when working in conjunction with an open-hearth or electric furnace, will permit the use of acid instead of basic refractories for these furnaces, the metal having been highly purified before being transferred to these furnaces, thus reducing the cost of construction and repairs, insuring abundant sources of supply of the refractories required, and, at the same time, insuring a higher quality of steel, due to carrying out the deoxidizing treatment in acid instead of in basic furnaces.

Another object of the invention is to provide an apparatus which, when working in conjunction with an open-hearth or electric furnace, will perform more than half the work normally performed by these furnaces when operating alone with cold charges of pig and scrap or all scrap as raw material, thus more than doubling the tonnage produced by these furnaces.

Another object of the invention is to provide an apparatus which, when working in conjunction with an open-hearth or electric furnace, will eliminate the need of scrap as an essential part of the raw material required for the economical production of steel by these furnaces when working by themselves, thus avoiding having to use as raw material miscellaneous scrap of uncertain composition, that may introduce undesirable or deleterious elements in the finished steel. Selected scrap of known composition may, however, be used indirectly up to, for instance, 25 or 30 per cent of the total charge by first putting it through the blast furnace or cupola supplying the liquid pig iron for the apparatus.

Another object of the invention is to provide an apparatus which, when used for the direct production of steel, will be capable of producing, rapidly and at low cost, using ordinary basic pig iron as raw material, highly purified steel of any desired composition, carbon or alloy, guaranteed free from any undesirable elements and containing a minimum amount of non-metallic inclusions, chiefly silicates of manganese, and of occluded gases, chiefly hydrogen, nitrogen and carbon monoxide, thus insuring a grade of steel particularly resistant to oft repeated or vibratory stresses, causing failures from fatigue, this relative freedom from inclusions and gases being the result of the third or de-oxidizing treatment carried out by the apparatus by electro-magnetic stirring of the metal with additions of electrically melted and super-heated deoxidizing acid slag, ferro-manganese and ferro-silicon under practically non-oxidizing conditions in vacuo.

The apparatus, as shown in the single figure of the drawing, comprises a ladle A and a removable cover B. The cover B is adapted to be placed over the open end of the ladle A and secured thereto, in any suitable manner, with a fluid-tight seal formed between the cover and the ladle, to exclude extraneous atmosphere from the interior of the ladle, and to prevent uncontrolled escape of heat from the interior of the ladle under predetermined operating conditions hereinafter disclosed.

The ladle A is preferably composed of an outer steel shell 1 comprising a convex bottom 1a and a circular side wall 1b, integrally united by a rounded corner 1c. The upper edge of the side wall 1b is reinforced by a steel ring 1d which is integrally secured to the shell 1, as by welding.

The ladle 1 is provided with a pouring lip 2, at one side of the top thereof, and a tipping lug 3, in the same vertical plane as the lip 2, at the opposite side near the bottom 1a of the ladle.

In a vertical plane at right angles to the common plane of the lip 2 and lug 3, and at an elevation intermediate the two, the ladle A is provided with a pair of opposite outwardly projecting lifting trunnions 25, which are adapted to be engaged by a pair of crane hooks or by the hooked ends of a bail to lift the ladle by a single crane hook.

The shell 1 is suitably lined with fire clay or other refractory, heat-insulating material arranged in a plurality of concentric layers, or walls, adjacent the side wall 1b of the shell and adjacent and parallel to the convex bottom 1a of the shell. The lining, as will appear more fully hereinafter, is composed of different kinds of materials in certain parts thereof to form definite zones for the metal and slag respectively.

Vertically, the metal zone is defined by and between relatively-spaced horizontal planes $x$—$x$ and $y$—$y$, with the upper level $x$—$x$ spaced downwardly from the upper edge of the ladle, and the lower limit $y$—$y$ coextensive with the inner surface of the inner layer of the bottom lining.

The inner bottom lining 5a and the inner wall lining 5, from said bottom up to a plane $z$—$z$, spaced below the metal level $x$—$x$, are preferably formed of ordinary fire clay brick; and from the plane $z$—$z$ upwardly to the rim of the ladle, the innermost lining 6, in which the lip 2 is formed, is preferably composed of neutral brick, such as "chromite" for example, which will be capable of withstanding the action of a basic oxidizing slag, and, for a predetermined period at least, the action of an acid deoxidizing slag.

Immediately adjacent the bottom 1a and extending up the side wall 1b to the lower plane $y$—$y$ of the metal zone, the shell 1 is lined with heat-insulating brick 4a; and from the plane $y$—$y$ to the plane $x$—$x$, immediately adjacent the side wall 1b, the shell 1 is provided with a wall or layer of similar heat-insulating brick 4.

From the plane $y$—$y$ upwardly to the plane $x$—$x$, intermediate the innermost lining 5 and the outermost lining 4, the ladle A is provided with a layer 8 of heat and electrical insulating material.

Between the innermost lining 6 and the wall 1b of the shell 1, from the plane $x$—$x$ to the rim of the ladle, or to the under side of a flange 6a of the lining 6, the ladle is provided with a ring of heat-insulating material 4b of the same kind as the linings 4 and 4a hereinbefore referred to.

Secured to the reinforcing ring 1d and extending inwardly therefrom to the inner edge of the innermost lining 6, except at the pouring lip 2, the ladle is provided with a flat seal-forming steel flange 1e.

Embedded in the intermediate lining layer 8, the ladle is provided with a helical electric coil 7 of heat-resisting alloy, preferably nickel-chrome, having a working temperature of from 1500° F. to 2000° F.

The nickel content of the alloy, of which the coil 7 is formed, is so adjusted as to make the co-efficient of thermal expansion of the alloy approximately equal to that of the electrically-insulating refractory layer 8.

Any suitable arrangement of controls may be provided for passing a polyphase alternating current of normal frequency, for example, 25 to 60 cycles per second through the coil 7. The voltage of the current passing through the coil 7 is stepped down for safe handling, and for other reasons as will appear hereinafter.

The electric current passing through the coil 7 serves two functions, first, to heat the inner lining 5—6, when the ladle is sealed, to a temperature close to that of the working temperature of the coil, both preliminary to and during treatment of metal in the ladle; and secondly, to stir the liquid metal in the ladle by a circulative vertical movement in the directions indicated by the arrows in the drawing, i. e., upwardly adjacent the inner surface of the inner lining of the ladle, then radially inwardly from all points around the circumference of said surface, then downwardly at and adjacent the axis of the ladle, and then radially outward adjacent the bottom of the metal zone. This circulation is created by the electro-magnetic force induced in the metal by the electric current surging through the coil 7.

The liquid metal M in the ladle A is topped, above the level $x$—$x$, with a layer of molten slag S, and in accordance with the second function of the current passing through the coil 7, the circulation of the metal M brings the metal M into intimate contact with the slag S, and produces quick and vigorous reactions between the metal and the slag, whether the slag be of an oxidizing or deoxidizing nature, or between the metal and other additions, as will appear more fully hereinafter.

Mounted on a suitable base for supporting the ladle A in an upright position, is a plurality of radially disposed angularly-spaced brackets 20 having their inner upper corners recessed and sloping inwardly to receive the rounded corner 1c of the shell 1 of the ladle A, and center the ladle in a definite position.

The cover B is of the inverted dish or shallow dome type, and comprises an outer shell 11 which is suitably lined with a layer of refractory heat insulation 12. To the rim of the shell 11, and extending inwardly therefrom beneath the insulating layer 12, is welded, or otherwise secured, a heavy steel skewback and sealing ring 13, which is adapted to bear against the flange 1e of the ladle 1 and the top surface of the refractory material of the lining 6 at and adjacent the pouring lip 2.

In order to form an air-tight joint with the ladle 1, the under side of the ring 13 is concentrically-grooved to provide relatively sharp V-shaped edges for contact with the flat surface of the flange 1e, and the flush smooth surface of the lining 6 at and adjacent the lip 2.

The top surfaces of the ladle may be covered with a plastic refractory sealing material into which the sharp edges of the ring 13 are pressed to facilitate the formation of the seal.

If desired, the seal may be further facilitated by the cover B and ladle A being clamped together with hook bolts 9 mounted in sockets 10 welded to the ring 1d, at 120° apart, one of said clamping devices, only, being illustrated in the drawing.

Axially located, on the outside of the sheel 11 of the cover B, and secured to said shell, is a stuffing box 21, through which, and a suitable axially-aligned aperture formed in the shell 11, extends an air tube 14. Preferably, the tube 14 is composed of heat-resisting nickel-chrome alloy similar to the alloy of the heating coil 7.

The terminal end and lower portion of the tube 14 shrouded by sleeves 18 and 19 of refractory material, the lower sleeve 19 being provided with an inner collar 19b, to protect the lower end of the tube 14, which is secured to the tube in any suitable manner, such as by plugs of refractory cement 19a packed in aligned radial openings formed in the tube and sleeve, respectively, and dried before use.

The tube 14 is provided with lugs 29, at its upper end, and is adapted to be moved axially, by any suitable means, through the stuffing box 21, from a position wherein the lower end of the sleeve 19 is above and clear of the slag S, at the plane W—W, for example, to any desired position with the lower end of the sleeve 19 submerged to any desired depth in the slag S, as shown in the drawing, or completely through the slag S and into the metal M, to the plane V—V for example, and to be maintained in any of the positions to which it may be adjusted, by any suitable means, such as the friction afforded by the packing material 22 employed in the stuffing box 21, for example.

The upper end of the tube 14 is adapted to be closed by a valve 26 which is adjustably mounted, and operated by a screw 28, in a frame 27 welded or otherwise permanently secured to the upper end of the tube 14, to prevent entrance of extraneous air into the ladle, when the valve is closed, or to admit air to restore atmospheric pressure with the sealed ladle, by opening the valve 26, under certain conditions of operation hereinafter disclosed.

During other periods of operation, which will also be disclosed hereinafter, the valve 26 is opened and the tube 14 is lowered into the position, shown in the drawing with its lower terminal sleeve end submerged to a greater or less extent in the body of slag S superimposed on the body of liquid metal M, or completely through the slag S into the metal M, at the plane V—V, to permit air to be drawn down through the tube and into the slag or the metal, as the case may be, by an air ejector 16, mounted in the cover B.

The air ejector 16 is preferably of non-condensing single-phase steam-jet type, constructed preferably of water-cooled bronze castings, and capable of evacuating the air from the air-space inside the sealed ladle, with the valve 26 on the tube 14, closed, in a few seconds, to produce a vacuum of not less than 26 inches of mercury.

If a higher vacuum is desired, a two-phase air-ejector or evacuator may be substituted for the single-phase evacuator 16 to provide a vacuum of not less than 29 inches of mercury.

Other functions of the air-ejector or evacuator 16 include the induction of a regulated downdraft of atmospheric air through the tube 14, and through the surrounding slag or metal, when the air valve 26 is opened and the tube 14 submerged, in order to oxidize the slag or the metal and thereby decarburize the latter, directly or indirectly under prescribed conditions; and to carry off the carbon-monoxide and nitrogen gases resulting from said decarburization, or the carbon-dioxide and nitrogen resulting from the combustion of the carbon-monoxide gas with atmospheric air under certain conditions; and to extract, by vacuum created in the sealed ladle, gases occluded in the liquid metal; and to produce a non-oxidizing atmosphere in the sealed ladle, all as will more fully appear hereinafter.

The cover B also is provided with a normally covered opening 17, through which, after atmospheric pressure has been restored within the sealed ladle temperature tests may be made and test samples of slag and/or metal may be taken from the contents of the ladle. The cover B is also provided with a sight glass 15, through which reactions within the sealed ladle can be readily observed during operation of the apparatus.

The ladle A and cover B, in combination, form a combustion chamber C, with the ladle deep enough and the crown of the cover high enough to constitute such a chamber of sufficient volume for use especially in the combustion of carbon monoxide evolved by decarburization of the metal M into carbon dioxide by atmospheric air drawn into the combustion chamber C through the tube 14 by the ejector 16.

As previously noted the apparatus is especially designed and constructed for use in converting high-phosphorus pig iron into high-quality, low-phosphorus steel, by a direct method which is divided into three distinct periods, namely:

I. The ore-oxidizing period.
II. The air-oxidizing period.
III. The de-oxidizing period.

*I. The ore-oxidizing period*

Liquid high-phosphorus pig iron from a blast furnace, hot-metal mixer or cupola is tapped into the electrically pre-heated ladle A, being followed by a molten oxidizing slag, composed chiefly of hematite ore, lime, and fluor spar, melted by any suitable means, as for instance a cupola or melting furnace, the weight of the slag being approximately 10% of the pig iron. The ladle cover B is then placed in position and clamped to the ladle A by hook-bolts 9 with the air-tube 14 in its high position, its bottom sleeve 19 well above slag S, for instance in horizontal plane W—W, and with valve 26 closed or nearly closed, leaving a slight opening to admit enough air for cooling tube 14 during this period. Steam is then admitted to the air-ejector 16 for the purpose of evacuating gases from the ladle, chiefly carbon monoxide or carbon dioxide generated by the combustion of the monoxide with the air admitted to the combustion chamber through valve 26; and for the purpose of preserving the heat by the heat-insulating effect of the vacuum produced. At the same time, the electric current is turned on into ladle coil 7 for the two-fold purpose of continuing the heating of the inner ladle lining and of starting a vigorous circulative movement of the metal M induced by the current for the purpose of bringing the metal into intimate contact with slag S, the direction of this movement as indicated by arrows being inwards near the slag zone, thus saving the ladle lining from direct attack by the slag.

This ore-oxidizing treatment carried on in the apparatus of the present invention is an improvement over the well known though seldom used Bell-Krupp process for the production of washed metal, by causing the elimination of the non-ferrous elements of the pig iron, except carbon, this being only slightly reduced. The result of this treatment in the present apparatus would be similar to that of the Bell-Krupp process, namely:

(a) The yield in washed metal would be approximately 100%, its weight about that of the pig iron submitted to the treatment.

(b) The final slag, being rich in iron, could be remelted in a blast furnace into basic pig iron.

(c) Maximum time for thorough purification of the pig iron in the Bell-Krupp process would be one hour, although the bulk of Mn, Si and P would be eliminated in a few minutes. In the proposed process the time would be shorter, due to the more vigorous stirring by electro-magnetic force compared to that produced by the slowly revolving hearth of the furnace used for the Bell-Krupp process. Probably half an hour would be the maximum time, using only one slag. Under certain conditions, it would, however, be better to carry out this ore-oxidizing period with two separate additions of slag, each about 5% in weight of the pig iron, getting rid of the first slag before adding the second, eliminating the bulk of Mn, Si and P with the first slag and using the second slag as a special refining slag, leaving it highly basic in composition and comparatively low in $P_2O_5$, which would be advantageous under certain conditions which will be referred to later.

Assuming that a charge of 25 tons of high-phosphorus pig iron to be submitted to the treatment of the ore-oxidizing period, and the composition of the pig iron to be as shown for example in the following table, said table will show approximately the chemical and thermal reactions that may be expected.

| Chemical elements | Pig iron | Washed metal | Hematite | Calories absorbed | Calories evolved |
|---|---|---|---|---|---|
| | Per cent | Per cent | Kg. | | |
| C | 3.80 | 3.60 | 220 | 150,000 | |
| Mn | 0.50 | Nil | 120 | | 60,000 |
| Si | 1.00 | Nil | 950 | | 430,000 |
| P | 0.25 | 0.025 | 490 | | 72,000 |
| S | 0.03 | 0.02 | 10 | | 5,400 |
| Total | | | 1,790 | 150,000 | 567,400 |

The composition of the final slag would be on the order of that of the Bell-Krupp process, a typical example of which would be as follows: $SiO_2$ 16.50, MnO 6.50, CaO 8.50, $P_2O_5$ 1.05, S 0.075, FeO 50.25, $Fe_2O$ 16.90. The chief difference would be, that the $P_2O_5$ would be higher, if only one slag were used for washing the iron, but considerably lower in the second slag, if two separate slags were used.

Thus the results of the chemical reactions of this first period would be washed metal of approximately the composition shown above and a final slag, in which the original ferric oxide, $Fe_2O_3$, would have been reduced to a mixture of ferrous and ferric oxides, the former predominant in the ratio of 3 to 1.

II. *The air-oxidizing period*

The purpose of this second period of the process is the decarburization of the washed metal from, for instance, 3.60% to the carbon aimed at in the finished steel, making allowance for any carbon added by the finals. To attempt to decarburize by additional amounts of hematite ore or other ferric oxides would be an endothermic reaction, and therefore would not do. What I propose is a decarburization by means of atmospheric oxygen, carried out as follows:

As soon as the reactions of the first period are finished, or even before these are finished, thus making the two periods overlap, the second or air-oxidizing period is commenced by opening valve 26 of the air-tube 14 and lowering the tube into the slag, as shown by the drawing. This is done without shutting down the air-ejector 16 or interrupting the heating of the ladle lining and the stirring of metal and slag by the electric current passing through the ladle coil 7. Atmospheric air is thus induced, by the difference in pressure of the atmosphere and the combustion chamber, as regulated by the valve 26, to flow through the air-tube 14 and the surrounding slag S in which the tube is immersed. Varying according to the depth of this immersion, the average slag pressure at the bottom end of the air-tube may be about one pound per square inch, corresponding to a difference in pressure of approximately two inches of mercury between the atmosphere and combustion chamber. As this resistance to the inflow of air is overcome by the pull of the air ejector with the gradual raising of valve 26, the flow of air is increased, until the desired rate of decarburization is attained.

By regulating the volume of air induced to pass through the surrounding slag, the FeO of the slag is reoxidized into $Fe_2O_3$ or $Fe_3O_4$, which, acting as carriers of oxygen, react with the carbon of the washed metal, as this is brought into intimate contact with the slag by the stirring electric current. This reaction is maintained until the metal has been decarburized to the carbon aimed at.

The calories evolved by the oxidation of FeO to $Fe_2O_3$ or $Fe_3O_2$ exactly balance the calories absorbed by the dissociation of the latter two in decarburizing the metal, the gain in heat during this period being the calories evolved by the oxidation of carbon to carbon-monoxide and the calories evolved by the oxidation of this carbon monoxide to carbon dioxide by an excess of air induced to flow through the slag into the combustion chamber by the manipulation of the air-valve 26 or the air-tube 14. This air, combining with the carbon monoxide escaping from the bath and the calories thus evolved, increase the temperature of metal and slag, as well as the surrounding refractory linings, before the spent gases are drawn off by the air-ejector.

The regulation of excess air by the manipulation of the air-tube is done simply by increasing or decreasing the air-tube's immersion in the slag. Under certain conditions, the air-tube may be lowered to bring the bottom sleeve 19 through slag S and into metal M to, for instance, horizontal plane V—V, thus causing air-oxidation of the metal directly for its decarburization.

Another way of increasing the temperature of metal and slag would be to add preheated ferromanganese or ferro-silicon or both by introducing them through the opening 17 into the slag and metal. Quick oxidation of the two elements, Mn and Si, by the oxygen-carrying slag would raise the temperature of both slag and metal. Care must be taken, however, either to have the slag sufficiently basic to prevent prosphorus from being thrown back into the metal by the addition of ferro-silicon, if only one slag is used in the ore-oxidizing period, or if two slags are used, to make these additions with the second slag, this being relatively low in $P_2O_5$.

On the other hand, should the metal become too hot during this second period, the temperature may be lowered by injecting steam into the air stream being drawn in through the air-tube 14, or by drawing in less excess air for the combustion of CO to $CO_2$.

The temperature of the metal may be ascertained at any time by plunging a steel rod through the opening 17 into the metal, stirring this for a certain length of time and then withdrawing the rod, judging the temperature by the appearance of the rod. Also test-samples of metal or slag from the contents of the ladle may be taken at any time through the same opening 17, for analysis, especially for quick determination of the carbon of the metal by means of a carbometer, and the temperature of the metal may be judged by noting its fluidity in the pouring of a test. Naturally atmospheric pressure has to be restored in the combustion chamber C before taking these tests, but due to the capacity of the air-ejector 16, that would mean only a momentary interruption of the vacuum maintained in the combustion chamber.

When the carbon is low enough for the composition aimed at, this marks the end of the second or air-oxidizing period. For a medium-size heat of, for instance, 25 tons, the time required may average about an hour, being controlled by the manipulation of the air-tube 14, the air-ejector 16 and the electric current.

As a comparison, the time of the decarburizing period of the Bessemer process would be about six minutes. Extending this to, for instance, sixty minutes is made feasible, first, by the method of decarburizing the metal, instead of forcing air through the metal; secondly, by the efficient heat-insulation of the vessel in which the process is carried out; thirdly, by the electrical heating of the inner ladle lining to a high temperature, both before and during the various periods of the process; fourthly, by providing a combustion chamber carefully heat-insulated, in which the carbon monoxide resulting from the decarburization of the metal is oxidized to carbon dioxide before escaping into the atmosphere; and, fifthly, although this would be exceptional, by increasing the heat of the metal by adding ferro-manganese or ferro-silicon or both during this period of the process. Finally, the heat-insulating effect of the vacuum produced during the first and third periods of the process will aid in preventing loss of heat.

The vacuum has also two important functions to fulfill during the third or de-oxidizing period of the process, these functions being to provide a non-oxidizing atmosphere in the combustion chamber and to degasify the metal.

III. The de-oxidizing period

The purpose of this third and last period of the proposed process is the final conversion of the decarburized metal produced by the reactions of the second period into a degasified and deoxidized steel of the exact composition aimed at, relatively free from occluded gases and non-metallic inclusions, this being accomplished as follows.

First, the electric current is turned off and the air-tube is raised to its high position with its lower end well above the slag, on the level of plane W—W. Then, with atmospheric pressure restored, valve 26 is closed except for a thread to permit enough air to be drawn in for cooling the air-tube, but not enough to noticeably affect the vacuum presently to be produced. This is followed by shutting off the air-ejector, after which the ladle cover B is removed and the ladle A picked up and tilted by a crane, for pouring and raking off the slag, after which the ladle is put back on its stands. By the time this is finished, the additions to be made to the liquid metal in the ladle in order to carry out the reactions of the third period will have been melted and superheated in the small acid electric arc furnace, its capacity about one-tenth of that of the ladle, these additions consisting of the de-oxidizers, ferro-manganese and ferro-silicon, of alloys or ferro-alloys, if alloy steel is aimed at, and of a synthetic, highly deoxidizing acid slag, in weight from two to three per cent of the metal under treatment. These are now added to the liquid metal, after which the ladle cover is replaced and everything made airtight except for the slight opening of valve 26 to admit enough air for cooling the tube, the air-ejector is again started, producing in a few seconds a vacuum of about 26 inches of mercury, and the electric current is turned on to resume the heating of the inner ladle lining and the stirring by electro-magnetic force of the metal and the electrically melted and superheated additions, this being carried out in a practically non-oxidizing atmosphere of highly attenuated gases, chiefly carbon-monoxide, hydrogen and nitrogen, extracted by vacuum from the metal, as this is being circulated, exposing all of it in turn to direct action by the vacuum and thereby to effective degasification.

The liquid ferro-manganese and ferro-silicon are brought into intimate contact with the oxidized steel, deoxidizing it by being themselves partly oxidized, thus forming silicates of manganese, which are the chief causes of non-metallic inclusions in the finished steel. In this process, however, due to the presence of the highly siliceous acid slag in intimate contact with the metal, this slag will almost instantaneously combine with the silicates of manganese in obedience to the law governing slag reactions, causing a strong chemical affinity of the slag for any chemical substance at hand, which will preserve or increase its fluidity.

The various reactions, due to the vigorous stirring by electro-magnetic force, will require only a few minutes to be carried out, after which the electric current is shut off and the metal, still under vacuum, is held in the ladle in a quiescent state for from 10 to 20 minutes. The loss of heat under prevailing conditions is negligible.

The air-ejector is then shut down and atmospheric pressure restored. The ladle cover B is removed and the ladle carefully decanted, the slag being held back to the last, into a highly preheated bottom-pouring ladle. The metal is held in this last ladle for several minutes to permit the metal still further to clear itself, after which it is poured off into moulds.

The synthetic acid slag of this third period, in weight only two to three per cent of the metal, will have very slight cutting effect on the ladle lining or stopper rod sleeves of the bottom-pouring ladle. This also contributes to the cleanliness of the finished steel.

*Total time for completing direct process*

The total time for carrying out the process, from the time the melted pig iron is tapped into the special ladle, until the finished steel is ready to be poured off into moulds, may vary from about two hours to perhaps three or four hours, depending on the weight of the charge and to some extent on the carbon aimed at, whether high or low, as well as on other circumstances. For instance, if the first or ore-oxidizing period is carried out with two separate additions of slag, removing the first before adding the second, instead of with a single slag treatment, which would be advantageous in case pig iron very high in phosphorus were used or steel very low in phosphorus be required. This would also be an advantage in case ferro-silicon additions were resorted to for increasing the heat of the metal during the second or air-oxidizing period, such additions then restricted to the treatment with the second slag, which would be comparatively low in $P_2O_5$, in order not to have phosphorus thrown back into the metal.

*The process in connection with the acid open-hearth process*

The first or ore-oxidizing period is carried out as in the direct process. The second or air-oxidizing period is also thus carried out up to a certain point, namely until the metal is decarburized sufficiently for the acid open-hearth furnace to take up the work. For instance, if steel with a carbon content of 0.50% is desired, the air-oxidation period commencing with an inherent carbon content in the washed metal of 3.60%, would be stopped at about 1.00%, after which the metal would be poured into the acid open-hearth furnace, holding back the basic slag and adding, instead thereof, some acid slag, preferably in liquid form. The acid furnace would take up the work of finishing the heat according to standard acid open-hearth practice for the production of high-grade steel of the desired composition, whether carbon or alloy.

For large open-hearth furnaces, it would not be necessary to have the apparatus of the same capacity as the open-hearth furnace, as two or more heats made successively by the apparatus may be used for one open-hearth heat.

*The process in conjunction with the acid electric process*

The first and second periods are both carried out as in the direct process, the metal in the second period being decarburized to the carbon desired in the finished steel with an allowance for the carbon added in the finals, the only work required by the electric furnace being that of the third or de-oxidizing period, as described in connection with the direct process. The chief difference is that, in this case, no provisions are made for the elimination of occluded gases by vacuum or the production of non-oxidizing atmosphere of highly attenuated occluded gases extracted by this vacuum, as provided for in the de-oxidizing period of treatment by the apparatus.

The low sulphur that may be obtained by the basic electric arc process may be obtained in the above duplex process by adding some fused soda ash, for instance 20 pounds per ton of pig iron as this is being drawn from a mixer or cupola into the ladle A of the apparatus, stirring it for a few minutes by electro-magnetic force, and skimming off the resulting slag before adding the oxidizing slag of the ore-oxidizing period.

*Other purposes for which the apparatus may be used*

The apparatus of the present invention may be used in conjunction with the Bessemer process, for the conversion of high-phosphorus pig iron into low-phosphorous steel. The first or ore-oxidizing period would be carried out, as described. The second or air-oxidizing period, however, would be carried out by a Bessemer converter. For this purpose it would be necessary, after first removing the slag of the ore-oxidizing period, and before pouring the washed metal into the converter, to add to it molten ferro-manganese and ferro-silicon in amounts to add to the metal, for example, 0.50% Mn and 1.25% Si, in order to furnish, by their exothermic reactions with the air, the heat required. The blown steel may be finished in the usual way, or may be submitted with certain modifications to the de-oxidizing period in ladle A, altered to a bottom-pouring ladle and used without cover.

The apparatus of the present invention may be used for the conversion of high-phosphorus pig iron, whether basic or foundry, into low-phosphorus iron or steel castings of any desired carbon content, or manganese and silicon contents, whether for gray cast-iron castings, or white cast-iron castings for conversion into malleable castings, or semi-steel or steel castings of any carbon content, high, medium or low, and in each of these cases, either carbon or alloy metal.

In either case, the process may be carried out by the same process as for the conversion of high-phosphorus pig iron, as drawn from a cupola or hot-metal mixer, into high-quality low-phosphorus steel, the only difference being the degree of decarburization by the air-oxidizing treatment of the washed metal, produced by the ore-oxidizing treatment from an inherent carbon content of, for example 3.80%. The carbon may vary in gray iron from 3.60 to 2.80%; in white iron from 2.80 to 2.00%; in semi-steel from 2.00 to 1.20%; in high-carbon steel from 1.20 to 0.60%; in medium carbon from 0.60 to 0.30%; and in low-carbon from 0.30 to 0.10%.

Thus, from any grade of basic or foundry iron, drawn from a mixer or blast furnace or melted in a cupola, any one of the above grades of castings may be manufactured under close control as to chemical composition and relatively free from non-metallic inclusions and occluded gases, all the final additions having been melted in a small acid electric arc furnace and their reactions carried out under vacuum and in a non-oxidizing atmosphere of highly attenuated gases extracted from the liquid metal, chiefly hydrogen, nitrogen and carbon monoxide.

Although, in the foregoing, only the use of the apparatus in connection with ferrous metals has been dealt with, it may be found useful also in the treatment of non-ferrous metals or alloys of metals for the carrying out one or more of the functions of which it is capable, without here specifying the exact methods for the use of which it may be found advantageous.

I claim:

1. An apparatus for treating liquid molten metal, comprising a ladle open at its upper end, a cover for the open end of the ladle, electric means for effecting circulation of the liquid contents of the ladle, means carried by said cover for evacuating gaseous fluid from the ladle between said cover and said contents, and means carried by said cover and adapted to be raised and lowered with respect to said contents for admitting a regulated flow of extraneous air into the interior of the ladle.

2. An apparatus according to claim 1, wherein the contents of the ladle consists of molten liquid metal and a layer of molten liquid slag superposed on the liquid metal, and wherein the air admitting means is in the form of a tube which is adjustable from a position with the discharge end of the tube disposed above said slag to a position with said end submerged in said slag or to position with said end submerged in said metal below said slag.

3. An apparatus according to claim 1, wherein the air admitting means is in the form of a tube arranged with one end projecting through said ladle cover into said ladle, and wherein the flow of extraneous air to the interior of the ladle is controlled by an adjustable valve on the opposite end of the tube exposed above said cover.

4. An apparatus according to claim 1, wherein the air admitting means comprises a tube projecting through the ladle cover with its discharge end disposed within the interior of the ladle, and a sleeve of refractory material extending along and around said tube inwardly from said end thereof and projecting axially beyond said end.

5. An apparatus according to claim 1, wherein the ladle comprises a metallic outer shell, and a multi-layer lining including an innermost layer of refractory material, an outermost layer of heat insulating material, and an intermediate layer of electric insulating material, and wherein the means for effecting circulation of the contents of the ladle comprises an electric coil imbedded in said intermediate layer.

6. An apparatus according to claim 1, wherein the ladle comprises a metallic outer shell, and a multi-layer lining including an innermost layer of refractory material, an outermost layer of heat insulating material, and an intermediate layer of electric insulating material extending substantially from the bottom of the ladle to the normal level of the liquid molten metal contents of the ladle, and wherein the means for effecting circulation of the contents of the ladle comprises an electric coil imbedded in said intermediate layer.

7. An apparatus according to claim 1, wherein the ladle comprises a metallic outer shell, and a multi-layer lining including an innermost layer of refractory material, an outermost layer of heat insulating material, and an intermediate layer of electric insulating material extending substantially from the bottom of the ladle to the normal level of the liquid molten metal contents of the ladle, an inner layer of refractory material and an outer layer of heat insulating material across the bottom of the ladle below the lower edge of said electric insulating material, and around said ladle above the upper edge of said electric insulating material, and wherein the means for effecting circulation of the contents of the ladle comprises an electric coil imbedded in said intermediate layer.

8. An apparatus according to claim 1, wherein the cover and the upper part of the ladle above the molten liquid metal therein constitute a combustion chamber of sufficient volume to afford combustion of carbon monoxide from the metal into carbon dioxide assisted by said regulated flow of extraneous air, said combustion being effected in said chamber before said carbon monoxide is evacuated by said evacuating means from the covered ladle.

9. An apparatus according to claim 1, wherein said evacuating means is adapted to induce said flow of air into the interior of the covered ladle, and wherein the extent of said flow is regulated by a valve included in said air admitting means.

BALTZAR E. L. DE MARÉ.